(12) United States Patent
Venter

(10) Patent No.: US 8,336,288 B2
(45) Date of Patent: Dec. 25, 2012

(54) GAS-TURBINE ENGINE IN PARTICULAR AIRCRAFT ENGINE

(75) Inventor: Gideon Venter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 218 days.

(21) Appl. No.: 12/453,622

(22) Filed: May 15, 2009

(65) Prior Publication Data

US 2009/0293449 A1  Dec. 3, 2009

(30) Foreign Application Priority Data

May 16, 2008 (DE) .................. 10 2008 024 022

(51) Int. Cl.
*F02K 3/02* (2006.01)

(52) U.S. Cl. .............. 60/226.1; 60/806; 60/231; 60/782; 60/262; 60/785

(58) Field of Classification Search ............... 60/226.1, 60/262, 782, 785, 806, 231
See application file for complete search history.

(56) References Cited

U.S. PATENT DOCUMENTS

| | | | |
|---|---|---|---|
| 2,529,973 A | 11/1950 | Sedille | |
| 2,650,666 A | 9/1953 | Dorand | |
| 3,375,996 A | 4/1968 | Wilde | |
| 3,472,487 A | 10/1969 | Moellmann | |
| 3,508,403 A | 4/1970 | Neitzel | |
| 4,005,575 A * | 2/1977 | Scott et al. | 60/226.1 |
| 4,294,068 A | 10/1981 | Klees | |
| 5,044,153 A | 9/1991 | Mouton | |
| 5,117,628 A | 6/1992 | Koshoffer | |
| 5,163,286 A * | 11/1992 | Jaw | 60/39.17 |
| 5,485,717 A * | 1/1996 | Williams | 60/773 |
| 5,845,482 A | 12/1998 | Carscallen | |
| 6,647,708 B2 * | 11/2003 | Bornhoft et al. | 60/226.1 |
| 2006/0277919 A1 * | 12/2006 | Martensson et al. | 60/785 |

FOREIGN PATENT DOCUMENTS

| | | |
|---|---|---|
| CH | 496 169 A | 9/1970 |
| DE | 16 26 109 A | 3/1971 |
| DE | 2328460 | 1/1975 |
| DE | 35 17 486 A1 | 11/1985 |
| DE | 40 28 259 C2 | 3/1993 |
| DE | 10 2005 006 415 A1 | 8/2006 |
| GB | 2 158 879 A | 11/1985 |

OTHER PUBLICATIONS

European Search Report dated Aug. 8, 2012 from counterpart application.

* cited by examiner

*Primary Examiner* — William H Rodriguez
*Assistant Examiner* — Craig Kim
(74) *Attorney, Agent, or Firm* — Timothy J. Klima; Shuttleworth & Ingersoll, PLC

(57) ABSTRACT

On a gas-turbine engine, in particular an aircraft engine, with a fan, a fan casing and a fan duct as well as with high-pressure and low-pressure turbines arranged behind each other in flow direction in the casing of the engine, the auxiliaries connected are to be operated with only a small increase in engine power. For this purpose in the flow direction of the airflow (20) exiting from the high-pressure turbine (15) a bleeding mechanism is provided for bleeding radially into the fan duct (4) at least part of the airflow (20) leaving the high-pressure turbine (15) on the upstream side of the low-pressure turbine (16).

8 Claims, 1 Drawing Sheet

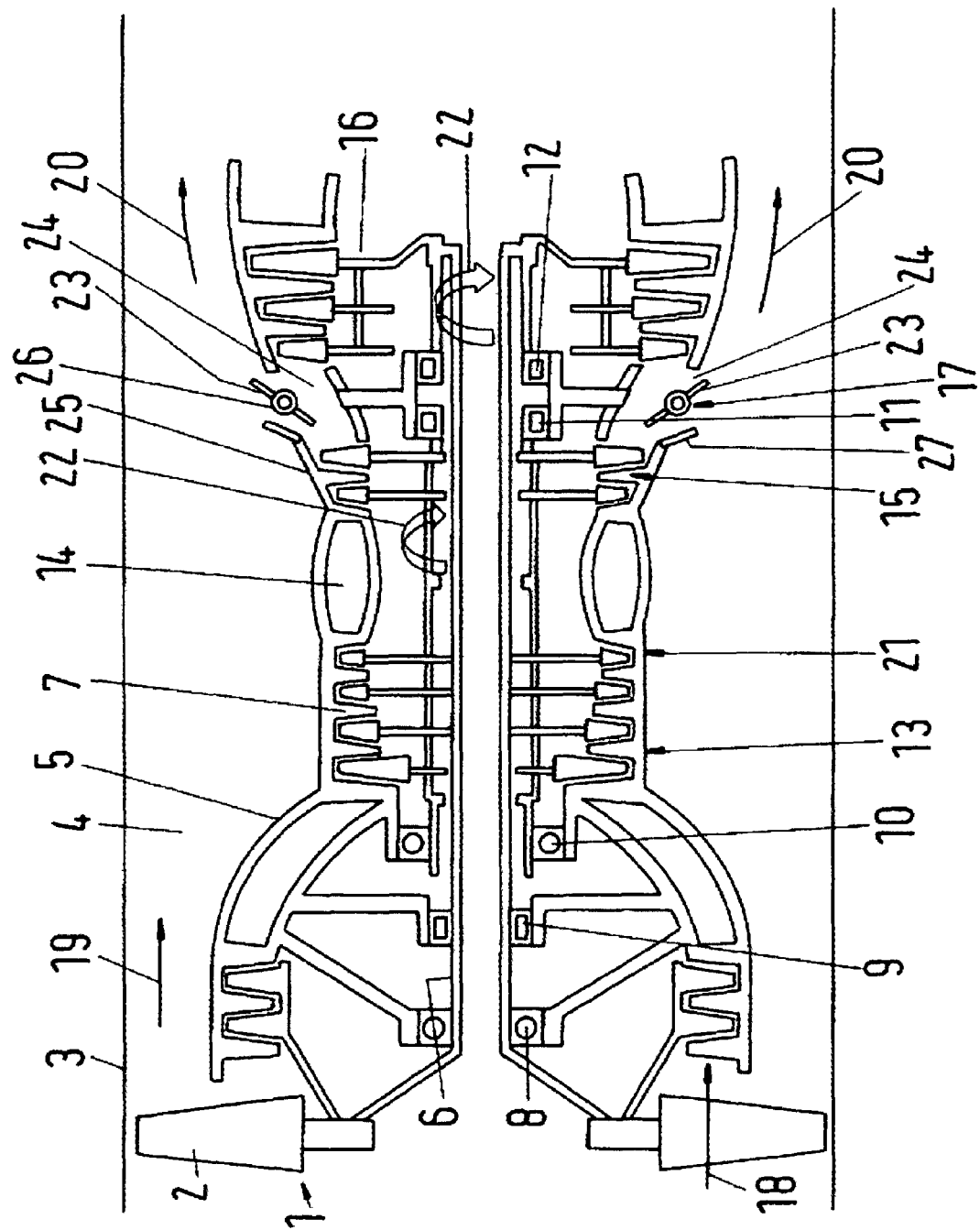

GAS-TURBINE ENGINE IN PARTICULAR AIRCRAFT ENGINE

This application claims priority to German Patent Application DE102008024022.2 filed May 16, 2008, the entirety of which is incorporated by reference herein.

This invention relates to a gas-turbine engine, in particular an aircraft engine, with a fan, a fan casing and a fan duct as well as with high-pressure and low-pressure turbines arranged behind each other in flow direction in the casing of the engine.

A gas-turbine engine, in particular an aircraft engine, of the type specified at the beginning is known from Specification DE102005006415 A1. On this engine, the power for the operation of the auxiliaries connected is taken off a shaft of the engine. This can be the low-pressure shaft or also the high-pressure shaft, so that the driving power for the auxiliaries is produced by the high-pressure system of the engine. When starting the engine, the direction of the driving power is reversed and the high-pressure system accelerated to the required starting speed.

The increasing demand for electric power or energy requires that considerably more power be taken off the high-pressure system. The increased power take-off influences the operability of the engine on the ground and during descent at idle conditions. This additional power take-off reduces the thrust power of the high-pressure system and requires that the working line of the engine be raised.

This is obtained by increasing the speed of the engine. The increase in engine speed also increases the speed of the low-pressure system, resulting in a combined increase in thrust force.

The increased thrust force at idle conditions on the ground and during descent is disadvantageous in that the minimum requirements for the speed on the ground and during braking must be raised and, furthermore, the duration of aircraft descent, with higher fuel consumption and prolonged descent phase, is extended.

In a broad aspect, the present invention provides a gas-turbine engine of the generic type which enables the auxiliaries connected to be operated with less increase in the power of the engine.

It is a particular object of the present invention to provide, in the direction of the airflow leaving the high-pressure turbine and downstream of the high-pressure turbine, an arrangement for bleeding at least part of the airflow leaving the high-pressure turbine on the upstream side of the low-pressure turbine radially into the fan duct.

The present invention, in essence, provides for the introduction of a system by which the air flowing between the high-pressure and the low-pressure compressor is bled into the fan duct or the fan airflow, respectively, during the respective idle conditions.

According to a further essential feature of the present invention, the arrangement for bleeding the airflow between the high-pressure turbine and the low-pressure turbine includes air openings leading into the fan duct which are arranged in the casing of the engine and can be closed by flaps, to radially bleed and introduce into the fan duct, at least part of the airflow exiting from the high-pressure turbine. The flap valves are opened if both the speed and the minimum thrust force level are reached.

According to the present invention, flap valves are therefore provided in the engine casing between the high-pressure turbine and the low-pressure turbine to bleed or discharge at least part of the airflow or the air, respectively, to prevent the full volume of air from passing through, and producing power in, the low-pressure turbine. If the low-pressure turbine receives less air and, consequently, produces less or no power, the rotational speed of the fan will also be reduced or the latter not be driven at all. As a secondary effect, the air flowing through the fan duct will be retarded.

With the present invention, a system is introduced in which, by bleeding at least part of the interstage turbine air, the air volume expanded by the low-pressure turbine is reduced and an increase of the speed and thrust force of the low-pressure turbine is avoided when the high-pressure system is accelerated to meet the mechanical power demands.

Bleeding at least part of the air from the high-pressure turbine into the fan duct also results in blockage of the air flowing through the fan duct, thereby reducing the airflow passing the fan duct. It is required that a minimum speed of the fan be maintained to obtain an adequate airflow in the fan duct, to mix this airflow with the hot airflow at the interturbine bleed and to prevent the components in the fan duct from being overheated.

The increased pressure drop on the high-pressure turbine may also result in an increase in engine power, reducing the speed required for the operation of the high-pressure system when increased mechanical power is demanded, consequently resulting in less fuel consumption.

This system, which enables the air bleed downstream of the high-pressure turbine to be increasingly reduced, allows the speed of the engine to be kept unchanged while changing the speed of the aircraft during ground operation and the descent ratio during landing approach, adapting to the respective requirements by variation of the volume of the air bled.

An example of the gas-turbine engine, in particular the aircraft engine in accordance with the present invention is more fully described in light of accompanying drawing.

FIG. 1 shows a schematic sectional view of the gas-turbine engine of the present invention in the longitudinal direction.

The gas-turbine engine shown includes a fan 1 with fan blades 2 to produce a core airflow 18 for the core engine 21 and a fan casing 3 to which a fan duct 4 which encloses the casing 5 of the core engine 21 is attached and which is flown by a fan airflow 19 also produced by the fan blades 2. Thus, part 18 of the aspirated air is delivered by the fan 1 through the core engine 21 and another part 19 through the fan duct 4. In the casing 5 of the core engine 21, a low-pressure shaft 6 and a high-pressure shaft 7 surrounding the latter are borne in several bearings 8, 9, 10, 11 and 12. Downstream of the fan 1, a high-pressure compressor 13, a combustion chamber 14, a high-pressure turbine 15 and a low-pressure turbine 16 are arranged in this sequence. The fan 1 and the low-pressure turbine 16 are located on the central low-pressure shaft 6. The high-pressure shaft 7 extends co-axially to the low-pressure shaft 6 and surrounds the latter. The two shafts 6 and 7 rotate in the same sense, as indicated by the rotational direction arrows 22.

Downstream of the high-pressure turbine 15 and upstream of the low-pressure turbine 16 and between these two turbines 15, 16 or between the third bearing 11 and the fourth bearing 12, respectively, a bleeding mechanism 17 for bleeding at least part of the airflow 20 exiting from the high-pressure turbine 15 is provided in the casing 5 of the engine 21 on the upstream side of the low-pressure turbine 16. The mechanism 17 is provided with closable flaps, or valve flaps 23 arranged in the casing 5 of the engine in air openings 24 disposed in the casing 5 and leading to the fan duct 4 to radially outwardly bleed, and divert into the fan duct 4, at least part of the airflow exiting from the high-pressure turbine 15.

As schematically shown in FIG. 1, the air openings 24 are provided immediately in the outer wall 25 of the casing 5. The valve flaps 23 are pivotable around axes 26 located in the wall 25. The valve flaps 23 are pivotable from the half-open position shown in the Figure to a closed position in which they are flush with the wall 25 and tightly close the air openings 24. Upstream air baffles 27 prevent the fan airflow 19 from directly entering the air openings 24.

In an alternative embodiment not shown, the flaps 23 can also be moveable directly in the airflow 20 between the high-pressure turbine 15 and the low-pressure turbine 16, when the air openings 24 are open.

LIST OF REFERENCE NUMERALS

1 Fan
2 Fan blade
3 Fan casing
4 Fan duct
5 Engine casing
6 Low-pressure shaft
7 High-pressure shaft
8-12 Bearing
13 High-pressure compressor
14 Combustion chamber
15 High-pressure turbine
16 Low-pressure turbine
17 Bleeding mechanism
18 Core airflow
19 Fan airflow
20 Airflow
21 Core engine
22 Rotational direction arrow
23 Valve flap
24 Air opening
25 Wall
26 Axis
27 Air baffle

What is claimed is:

1. A gas-turbine engine, comprising:
a fan;
a fan casing;
an engine casing;
a fan duct positioned between the fan casing and the engine casing;
high-pressure and low-pressure turbines arranged behind each other in a flow direction in the engine casing; and
a bleeding mechanism positioned on an upstream side of the low-pressure turbine for bleeding at least part of an airflow leaving the high-pressure turbine radially into the fan duct;
wherein the bleeding mechanism includes a plurality of air openings leading into the fan duct and a plurality of valve flaps for opening and closing the air openings;
wherein the valve flaps are moveable directly into the airflow between the high-pressure turbine and the low-pressure turbine when the air openings are open to at least partially block the airflow between the high-pressure turbine and the low-pressure turbine and divert that airflow into the fan duct;
wherein, when the valve flaps are moved directly into the airflow to at least partially block the airflow, portions of the valve flaps that block the airflow do so to an extent that they extend radially inward of the engine casing.

2. The engine of claim 1, wherein the air openings are positioned in an outer wall of the engine casing.

3. The engine of claim 2, wherein the valve flaps are respectively pivotable about axes, which are located in the outer wall.

4. The engine of claim 3, wherein the valve flaps are pivotable between an open position and a closed position in which they are flush with the wall and tightly close the air openings in the casing.

5. The engine of claim 4, and further comprising at least one air baffle positioned on the outer wall in the fan duct upstream of the air openings to shield the air openings.

6. The engine of claim 1, and further comprising at least one air baffle positioned on the outer wall in the fan duct upstream of the air openings to shield the air openings.

7. The engine of claim 2, and further comprising at least one air baffle positioned on the outer wall in the fan duct upstream of the air openings to shield the air openings.

8. The engine of claim 3, and further comprising at least one air baffle positioned on the outer wall in the fan duct upstream of the air openings to shield the air openings.

* * * * *